(12) United States Patent
Hill, Jr.

(10) Patent No.: US 9,174,882 B2
(45) Date of Patent: Nov. 3, 2015

(54) METHOD FOR CONVERTING OIL-BASED DRILLING FLUIDS, FRACKING FLUIDS, AND PRODUCED WATERS INTO FERTILE INDIGENOUS TOP SOIL

(71) Applicant: Houston E. Hill, Jr., Edmond, OK (US)

(72) Inventor: Houston E. Hill, Jr., Edmond, OK (US)

( * ) Notice: Subject to any disclaimer, the term of this patent is extended or adjusted under 35 U.S.C. 154(b) by 5 days.

(21) Appl. No.: 14/154,078

(22) Filed: Jan. 13, 2014

(65) Prior Publication Data

US 2015/0197459 A1  Jul. 16, 2015

(51) Int. Cl.
| | |
|---|---|
| C05F 11/08 | (2006.01) |
| C02F 3/02 | (2006.01) |
| C05F 11/00 | (2006.01) |
| C05G 3/00 | (2006.01) |
| C05F 3/00 | (2006.01) |
| C02F 101/32 | (2006.01) |
| C02F 103/10 | (2006.01) |

(52) U.S. Cl.
CPC . *C05F 11/08* (2013.01); *C02F 3/02* (2013.01); *C05F 3/00* (2013.01); *C05F 11/00* (2013.01); *C05G 3/00* (2013.01); *C02F 2101/32* (2013.01); *C02F 2103/10* (2013.01)

(58) Field of Classification Search
None
See application file for complete search history.

(56) References Cited

U.S. PATENT DOCUMENTS

| | | | |
|---|---|---|---|
| 4,947,932 | A | 8/1990 | Silver et al. |
| 5,817,504 | A | 10/1998 | Lasky et al. |
| 7,322,152 | B2 | 1/2008 | Hill |

OTHER PUBLICATIONS

Wedel, Jr., Frederick L.,"Drilling Mud Components and Systems", 6 pages.
Allen, Nick, "Microbe eating spilled oil in Gulf of Mexico", Aug. 2010, (http//www.telegraph.co.uk/finance/newsbysector/energy/oilandgas/7964175/Microbe-eating-spilled-oil-in-Gulf-of-Mexico.html), 2 pages.
SOS Environmental,"Treatment of Salt Affected Soil in the Oil Field",(http://sosenvironmental.com/Saltwater-Salt.html), 11 pages.
Guerra et al., "Oil and Gas Produced Water Management and Beneficial Use in the Western United States", Reclamation Magazine Science and Technology Program Report No. 157, U.S. Department of the Interior Bureau of Reclamation, Sep. 2011, 129 pages.
ScottK,"Name of Bacteria Used to Clean Up Oil Spills", (http://www.ehow.com/list_6435124_name-clean-up-oil-spills.html), May 13, 2013, 2 pages.

(Continued)

*Primary Examiner* — Chester Barry
(74) *Attorney, Agent, or Firm* — Dunlap Codding, P.C.

(57) ABSTRACT

A waste fluid is evaluated to determine if the waste fluid includes fracturing fluid requiring treatment for sodium; a hydrocarbon level requiring hydrocarbon treatment; and/or drilling fluid requiring clay treatment. The waste fluid is mixed with mature compost, organic fertilizer, and top from the well site. If the waste fluid requires treatment for sodium, calcium nitrate is mixed with the waste fluid in an amount sufficient to balance the sodium content thereof. If the waste fluid includes a hydrocarbon level requiring hydrocarbon treatment, an additional organic fertilizer is mixed with the waste fluid along with hydrocarbon-digesting microbes in an amount sufficient to inoculate the waste fluid. If the waste fluid includes drilling fluid requiring clay treatment, the waste fluid is mixed with gypsum to break up and reduce adhesive characteristics of clay particles present in the waste fluid. The mixture is stirred and dried to produce fertile top soil.

9 Claims, 4 Drawing Sheets

(56) References Cited

OTHER PUBLICATIONS

Steel, J.,"Microbes Used to Clean Up Oil Spills", (http://www.ehow.com/info_8049264_microbes-clean-up-oil-spills.html), May 13, 2013, 2 pages.

Concept's, "Oil Eating Microbes", (http://www.cstore1.com/store/item.asp?ITEM_ID=74&DEPARTMENT_ID=138), May 13, 2013, 1 page.

Ubochi et al.,"Effect of inorganic fertilizer on microbial utilization of hydrocarbons on oil contaminated soil", African Journal of Biotechnology, vol. 5, pp. 1584-1587, (http://www.academicjournals.org/AJB) Sep. 4, 2006.

News Account,"Hydrocarbon-Eating Microbes Mean Oil Was an Ancient Energy Source Too", Published on Science 2.0, (http://www.science20.com), Sep. 9, 2008, 2 pages.

Petrozorb,"Oil Eating Microbes", (www.petrozorb.co.za/oil-eating-mircrobs.html), 2 pages.

Udotong et al.,"Bioconversion of Crude Oil Production Sludge into Soil Conditioner Using Sawdust as Organic Amendment", Research Paper, Geosystem Engineering, vol. 14, Issue 2, pp. 51-58, Jun. 2011, 8 pages.

METHOD FOR CONVERTING OIL-BASED DRILLING FLUIDS, FRACKING FLUIDS, AND PRODUCED WATERS INTO FERTILE INDIGENOUS TOP SOIL

BACKGROUND OF THE INVENTIVE CONCEPTS

1. Field of the Inventive Concepts

The present invention relates to a well site waste fluid decontamination process, and more particularly but not by way of limitation, to a process and apparatus capable of treating a variety of oil and gas related waste fluids to convert such waste fluids into fertile top soil.

2. Brief Description of Related Art

Oil and gas wells cannot be drilled and operated without creating waste. With good current waste management practices, the amount of waste and the toxicity of the waste can be reduced, but not eliminated. The waste varies from spent aqueous-based drilling muds, brines and produced waters, to sludge and spent oil-based drilling muds. Because of the physical and chemical variety of wastes generated, each waste type has historically been treated separately. For economies of scale, much of the waste is transported to be treated with similar waste at a treatment facility off site from the production well. This transportation of the waste creates additional potential hazards.

In view of the foregoing, there is a need for economic, versatile processes, operable at the source of contamination, such as an oil and/or gas well site, the processes being capable of treating all of the wastes generated and converting them to useful products. It is to such a well site waste fluid decontamination process that the presently disclosed and claimed inventive concepts are directed.

SUMMARY OF THE INVENTIVE CONCEPTS

A well site waste fluid decontamination process includes the following steps. A waste fluid is evaluated to determine if the waste fluid comprises fracturing fluid requiring treatment for sodium; a hydrocarbon level requiring hydrocarbon treatment; and/or drilling fluid requiring clay treatment. The waste fluid is mixed with mature compost, organic fertilizer, and top soil to form a mixture containing waste fluid, from about 30 to 150 volume percent mature compost, from about 5 to 20 volume percent organic fertilizer, and from about 5 to 20 volume percent top soil from the well site wherein each volume percent is based on the volume of the waste fluid present in the mixture. If the waste fluid includes fracturing fluid requiring treatment for sodium, calcium nitrate is mixed with the waste fluid in an amount sufficient to balance the sodium content thereof. If the waste fluid includes a hydrocarbon level requiring hydrocarbon treatment, an additional 5 to 100 volume percent organic fertilizer is mixed with the waste fluid along with hydrocarbon-digesting microbes in an amount sufficient to inoculate the waste fluid. If the waste fluid includes drilling fluid requiring clay treatment, the waste fluid is mixed with 5 to 15 volume percent gypsum to break up and reduce adhesive characteristics of clay particles present in the waste fluid. The mixture is stirred for a period of time effective to form a substantially homogenous mixture and dried so as to produce fertile top soil.

BRIEF DESCRIPTION OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, and drawings. The figures are not necessarily to scale and certain features and certain views of the figures may be shown exaggerated, to scale, or in schematic in the interest of clarity and conciseness. In the drawings.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction, experiments, exemplary data, and/or the arrangement of the components set forth in the following description, or illustrated in the drawings. The presently disclosed and claimed inventive concepts are capable of other embodiments or of being practiced or carried out in various ways. Also, it is to be understood that the phraseology and terminology employed herein is for purpose of description only and should not be regarded as limiting in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features have not been described in detail to avoid unnecessarily complicating the instant disclosure.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one, and the singular also includes the plural unless it is obvious that it is meant otherwise.

During the drilling and operation of wells to recover oil and gas, a wide variety of waste fluids and muds can be produced. The following discussion covers major categories of water-based and oil-based drilling muds, fracturing fluids and produced waters.

Water-Based and Oil-Based Based Drilling Muds.

When drilling the well, for example, it is necessary to circulate a liquid drilling mud down the drill pipe to the bottom of the well bore and up the well bore to the surface. The drilling mud keeps the geologic formation surrounding the well bore in place and enhances and maintains the ability to move the pipe up and down the well bore. The drilling mud performs several different functions in the rotary drilling operation. Examples of some of these functions are: 1) remove formation cuttings from the drilled hole, 2) suspend cuttings during trips, 3) form an impermeable wall cake, 4) prevent caving of the formation, and 5) control formation pressure.

A typical mud system for use in the drilling of oil and gas wells includes a mud holding tank, usually positioned at the well site on or adjacent the drilling rig, and a network of pumps, mixers and mud supply lines that run to and from the well bore. The mud holding tank is used to hold the various dry and liquid components of the drilling mud as they are mixed into a slurry to produce a drilling mud having the desired physical properties and characteristics. The drilling mud is then pumped from the mud holding tank through the mud supply lines and circulated through the well bore at the desired rate. The spent drilling mud can thereafter be cleaned or reconditioned during the drilling operation or deposited in a mud pit for subsequent removal to a remote disposal site.

Drilling muds of different types, weights and viscosity are required depending upon the depth of the well, geologic formations encountered and the diameter of a well bore. The term "drilling mud" is a term of art in the oil field industry and may be more accurately described as a "drilling fluid;" the term "drilling fluid" as used herein incorporates drilling mud. Drilling fluids can be extremely simple or extremely complex in structure and formulation, depending on where they are used and what they are used for. Drilling muds can be broken into at least three general categories: freshwater-based muds, saltwater-based muds and oil-based muds.

Water-based muds contain low to moderate levels of sodium chloride. However, more than 98% of the total volume of waste fluid are just natural ingredients, namely: 1) the liquid based water; 2) bentonite (clay particles); 3) barium (a weighting material); and 4) drilling solids (earth's subsurface).

Saltwater-based drilling fluids are often used for shale inhibition and for drilling salt formations. In some cases, solids-free and low-solids systems are formulated with high-density brines such as calcium chloride, calcium bromide, zinc bromide, and the like.

In some cases, an oil-based drilling mud is utilized. Oil-based drilling fluids are composed of oil as the continuous phase and water as the dispersed phase. Other constituents include emulsifiers, wetting agents, gelling agents, barite and treated bentonite. The oil phase is typically diesel, kerosene, fuel oil or mineral oil, requiring additional remediation measures.

Fracturing Fluids.

After the well has been drilled, completion can include "stimulation" or hydraulic fracturing, often referred to as "hydrofracking." Hydrofracking involves injection of hydraulic fracturing fluid, usually water-based, under pressure so as to create fractures. Hydraulic fracturing fluids include proppants (commonly sand), acids, and a number of chemical additives. The acids react with minerals present in the formation to create salts. Once the fractures are created, the pressure is released and much of the hydraulic fracturing fluid, along with formation fluids and contaminants, come back to the surface. This flowback waste fluid is considered industrial waste. High salt content, particularly sodium, can require additional remediation measures.

Produced Waters.

Much of the petroleum in the earth's crust was created by the decay of sea life. As a result, petroleum deposits often occur in aquifers containing brine (salt water). The water contained in reservoirs of oil and gas is known as "formation water." During production, a mixture of oil, gas, and formation water is pumped to the surface. The water is separated from the oil and gas and removed to tanks or pits, where it is referred to as "produced water." As the oil and gas in the reservoir are removed, more of what is pumped to the surface is formation water. Consequently, declining oil fields generate more produced water. Historically, produced water was disposed of in large evaporation ponds. However, this has become an increasingly unacceptable disposal method from both environmental and social perspectives. Produced water is considered an industrial waste requiring remediation measures.

Heretofore, many well site waste fluids could not be economically processed at the well site, requiring the operator to obtain permits in order to haul the waste fluid off the location for treatment or disposal. The cost of analyzing, hauling, handling and disposal of waste fluids can be very expensive. Where the waste goes and how it is handled is very important. The liability associated with the process of handling and disposing of waste fluids concerns the government, the public and of course the oil companies and their waste contractors. As long as the oil and gas industry generates large volumes of waste fluids, the government, in response to public pressure, may refuse to license oil companies to drill on public lands.

If a new technology were developed which would provide environmental protection, new energy supplies could be found, without the negative environmental cost. That is, if oil companies could drill for oil and gas and not generate any liquid or solid waste for disposal, the attitude toward oil companies would change overnight. Generation of waste is not the problem; the problem is the disposal of such waste.

The presently disclosed inventive concepts provide a process having the flexibility to treat multiple chemically diverse waste fluids produced at an oil and/or gas well site, and turn the waste fluids into "fertile indigenous top soil" at the well site within hours of the waste fluid being produced. The top soil will be at least as fertile, if not more fertile, than the surrounding soil, and will possess many of the same biological and mineralogical characteristics as the local soil. This is desirable because the enzymes and microorganisms in the soil present at the well site are already adapted to the specific local climate. The hauling, disposal and long term liability associated with the disposal of the waste fluids are alleviated if not eliminated.

In one embodiment, a well site waste fluid decontamination process evaluates a waste fluid to determine if the waste fluid includes one of a saline level requiring treatment for sodium; a hydrocarbon level requiring hydrocarbon treatment; and drilling fluid requiring clay treatment. Mature compost, organic fertilizer, and top soil are mixed with the waste fluid to form a mixture containing waste fluid, from about 30 to 150 volume percent mature compost, from about 5 to 20 volume percent organic fertilizer, and from about 5 to 20 volume percent top soil from the well site wherein each volume percent is based on the volume of the waste fluid present in the mixture.

If the waste fluid includes fracturing fluid requiring treatment for sodium, a calcium salt, for example calcium nitrate, is mixed with the waste fluid in an amount sufficient to balance the sodium content thereof. If the waste fluid includes a hydrocarbon level requiring hydrocarbon treatment, hydrocarbon-digesting microbes and an additional 5 to 100 volume percent organic fertilizer is mixed with the waste fluid.

Hydrocarbon-digesting microbes are mixed with the waste fluid in an amount sufficient to inoculate the waste fluid. If the waste fluid includes drilling fluid requiring clay treatment, about 5 to 15 volume percent gypsum is mixed with the waste fluid to break up and reduce adhesive characteristics of clay particles present in the waste fluid. The resulting mixture is stirred for a period of time effective to form a substantially homogenous mixture, and the substantially homogenous mixture is dried so as to produce fertile top soil.

The waste fluid can be analyzed to determine its pH and the presence of heavy metals, soluble salts such as sodium chloride, and hydrocarbons and petroleum products. Evaluation of the waste fluid to determine pH, heavy metals, salinity, and particularly sodium level, can be achieved by sampling and testing the fluid using analytical procedures and equipment known to those skilled in the art. Since the waste fluid decontamination process is located at the well site, operators likely know the source of the waste fluid and such knowledge can often determine the need for treatment of sodium, with analytical test procedures optionally supplementing the determination.

Evaluation of the waste fluid to determine the hydrocarbon level can also be achieved by sampling procedures using analytical procedures and equipment known to those skilled in the art. Alternatively, if the waste fluid includes an oil-based drilling or fracturing fluid, since these fluids are purchased or mixed on-site, the operator is likely to know not only that high hydrocarbon levels are present, but also which hydrocarbon(s) is predominate. Analytical sampling and testing can supplement the determination of process variables.

Evaluation of the waste fluid to determine clay content can be achieved by sampling, visual or microscopic examination, waste source knowledge, and procedures known to those skilled in the art. In spent water-based drilling fluid, for example, a portion of the solids may be bentonite, a weighting material added to most drilling muds, and a portion may be cuttings including subterranean clays.

A plurality of dry ingredients, i.e., a humus material such as mature compost, top soil from the well location, and organic fertilizer such as cow manure, chicken manure, pig manure and the like, are mixed with the waste fluid to form a substantially homogeneous mixture or slurry. If the viscosity of the homogeneous mixture is too high due to the amount of dry ingredients mixed with the waste fluid or the amount of water present in the waste fluid, fresh water is added to the mixture until the desired viscosity of the mixture is achieved.

The amount of the mature compost, organic fertilizer and indigenous top soil mixed with the waste fluid can vary. However, the mixture will generally contain an effective amount of waste fluid, from about 30 to 150 volume percent of mature compost, from about 5 to 20 volume percent organic fertilizer, and from about 5 to 20 volume percent indigenous top soil based on the volume of waste fluid present in the mixture.

"Mature compost" is used herein and in the appended claims to include humus as well as organic matter that has not completely decayed as far as humus. Humus is the stable, long lasting remnant of decaying organic material. Mature compost improves soil structure and increases water retention by increasing microporosity. Mature compost incorporates oxygen into large organic molecular structures having many active, negatively charged sites that bind to positively charged ions and plant nutrients, making them available to the plant by way of ion exchange. Mature compost includes trace elements and several important organic acids, but does not include significant nitrogen or phosphorus.

Nitrogen and phosphorus are provided by the addition of organic fertilizers, i.e., fertilizers derived from animal or vegetable matter. Examples of suitable organic fertilizers include, but are not limited to, such as cow manure, chicken manure and pig manure, worm castings, seaweed, humic acid and guano. Most organic fertilizers contain insoluble nitrogen allowing them to act as a slow-release fertilizer. By their nature, organic fertilizers increase physical and biological nutrient storage mechanisms in soils, and reduce the risk of over-fertilization that can occur with soluble chemical fertilizers.

In one embodiment, at least one of cow manure, chicken manure, and pig manure is added to the waste fluid in an amount of from about 5 to 20 volume percent based on the volume of waste water.

By incorporating an effective amount of the top soil at the well location with a mixture containing waste fluid, mature compost, and the organic fertilizer, an enzyme base is provided in the mixture corresponding with the soil surrounding the well location, and the micro-organisms present in the mixture are enhanced so that the hydrocarbon present in the waste fluid is consumed by the enzymes while, at the same time, the nitrogen level of the resulting fertile indigenous top soil so produced is increased by the organic fertilizer.

Additional ingredients or components can be introduced into the mixture. For example, if the pH of the waste fluid is less than 7, natural material, such as lime (CaO), potassium hydroxide (KOH), and the like, can be added to provide the waste fluid with a higher pH to prevent any heavy metals present in the waste fluid from becoming water soluble and to insure that heavy metals adhere to the clay particles present in the waste fluid.

To control and/or reduce the level of water-soluble salts such as sodium chloride in the produced fertile top soil, particularly if the waste fluid includes fracturing fluid requiring treatment for sodium, an effective amount of calcium, magnesium and/or potassium is added to the waste fluid. The calcium, magnesium and/or potassium functions to balance the sodium ions and to provide a mass ion effect for soil adsorption and ion exchange with the clays present naturally. The sodium is more readily washed out of the top soil, thereby retaining other cations necessary for plant health.

In one embodiment wherein the waste fluid requires treatment for sodium, calcium nitrate, also called Norgessalpeter (Norwegian saltpeter), is added to the waste fluid. Calcium nitrate is used as a component in fertilizer and is found naturally as the mineral nitrocalcite. A variety of related salts including calcium ammonium nitrate decahydrate and calcium potassium nitrate decahydrate, can be used to provide calcium nitrate to the waste fluid. In another embodiment, calcium and nitrogen are added as NITRACAL-100™ and supplemented by NITRACAL-SC™ soil conditioners offered by SPL Control, L.L.C. of Elmore City, Okla.

Typically, hydrocarbon levels present in water-based drilling muds and produced waters can be remediated by microbes naturally present in the indigenous soil, particularly since the organisms present in the mixture are enhanced by the addition of 5 to 20 volume percent organic fertilizer. In this way the hydrocarbon present in the waste fluid is consumed by the enzymes. However, high hydrocarbon levels in the waste fluid, particularly if it includes spent oil-based drilling fluids and oil-based fracturing fluids, can require additional organic fertilizer and addition of hydrocarbon-digesting microbes in sufficient quantities to inoculate the waste fluid.

In one embodiment, when evaluation of the hydrocarbon level in the waste fluid warrants additional organic fertilizer, an additional 5 to 100 volume percent organic fertilizer is added to the waste fluid, the volume percent based on the volume of waste fluid. The organic fertilizer adds nitrogen and phosphorus needed by the hydrocarbon-digesting microbes also added to the waste fluid.

A number of hydrocarbon-digesting microbes have been discovered and can be utilized in the present inventive concepts. Some of these microbes require oxygen, and some can digest hydrocarbons without the need for oxygen. For example, one well known suitable oil-eating bacteria is the genetically engineered form of bacterium under the genus *Psuedomonus* developed by the microbiologist Chakrabarty. Chakrabarty's bacterium was used to help clean the Exxon Valdez oil spill. Another suitable microbe is Alcanivorax Borkumensis, a naturally occurring marine bacterium that relies on oil hydrocarbons as its only source of energy. Yet another example of suitable microbes is SpillRemed™, a commercial product developed by Sarva Bio Remed as an oil clean-up solution. SpillRemed™ contains bacteria including *Pseudonomas* Pseudoalkaligenes and Phenylobacterium Immobile that break oil down into carbon dioxide and water. Once the hydrocarbons are depleted, the bacteria die off.

If the waste fluid is determined to include drilling fluid requiring clay treatment, from about 5 to 15 volume percent of gypsum can be added, the volume percent based on the volume of waste fluid present in the mixture. Gypsum is a hydrated calcium sulfate commonly used for gypsum board, plaster, fertilizer, and soil conditioner. The gypsum breaks up and reduces the adhesive properties of the clays. This increases the distance between the clay particles so that sodium can migrate throughout the fertile indigenous top soil produced in accordance with the present inventive concepts and thus, prevent destruction or burning of the roots and seeds of plants planted in such soil.

To effect the conversion of the mixture containing the waste fluid, air or heated air, or compressed or heated compressed air can be injected into the mixture in an amount and at a velocity sufficient to substantially saturate the mixture and thereby enhance the activity of the enzymes present in the mixture, as well as dry the resulting indigenous fertile top soil produced from the mixture.

Figure 1:
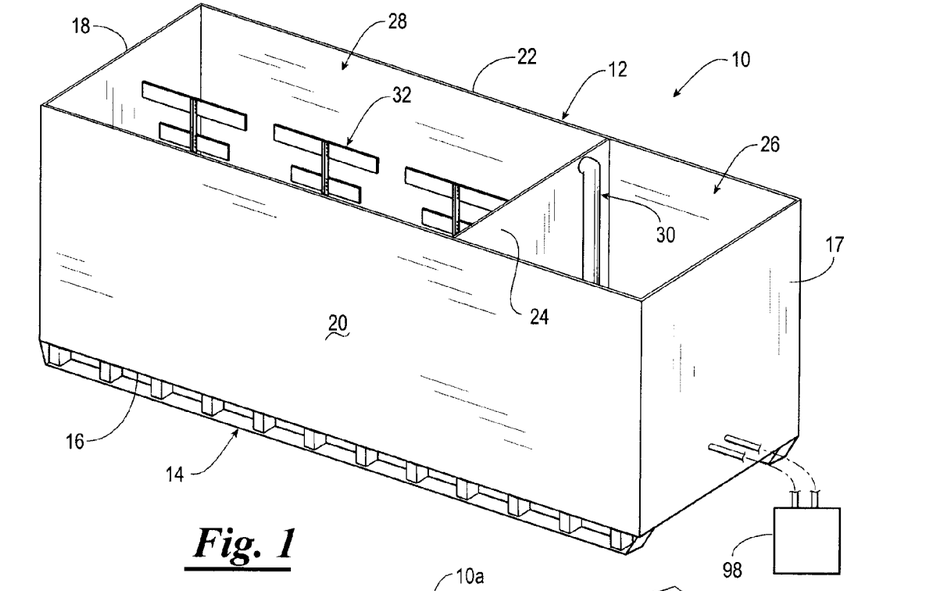
FIG. 1 is a pictorial representation of an apparatus for converting well site waste fluids into indigenous fertile top soil at a well site in accordance with the inventive concepts disclosed herein.
Figure 3:
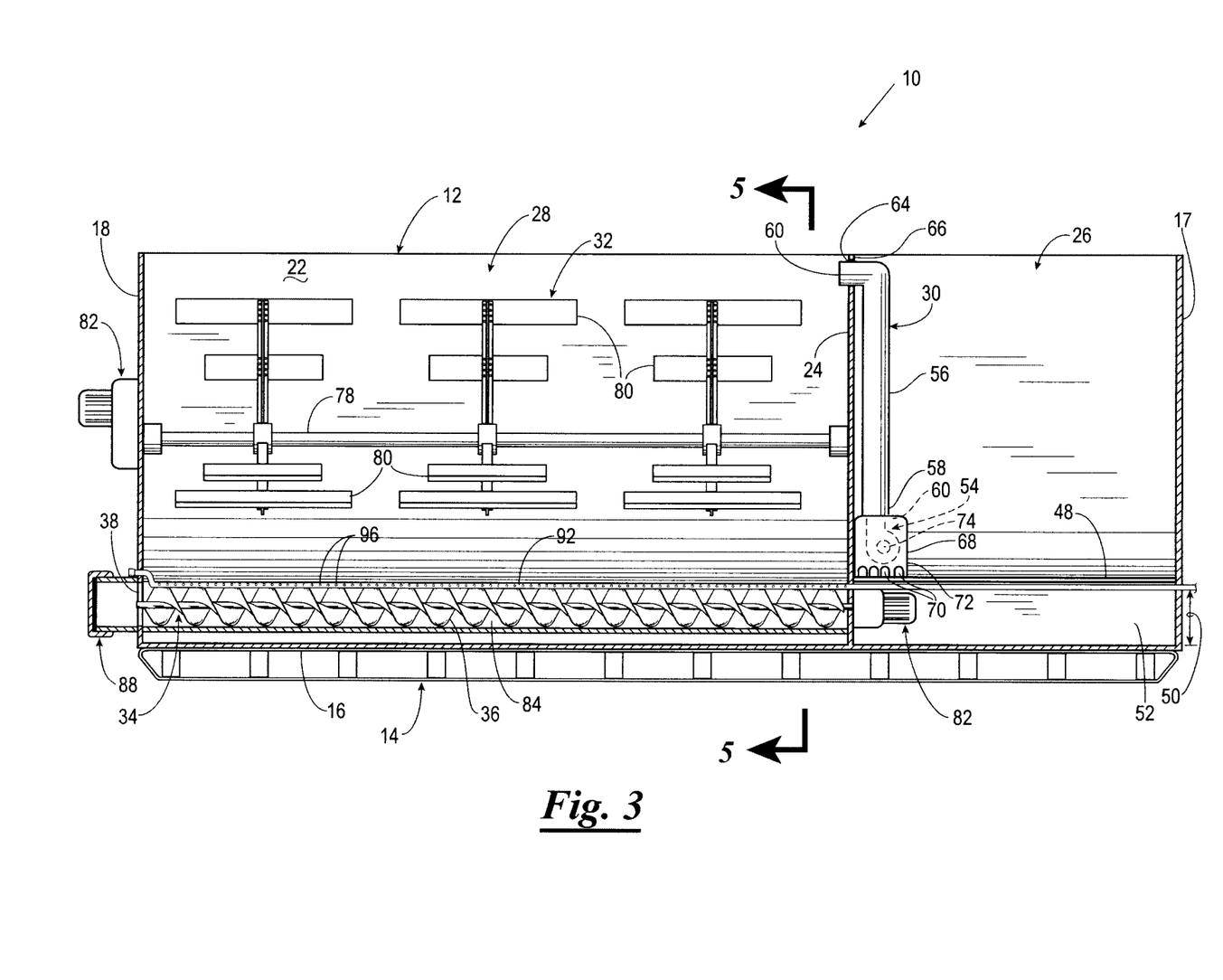
FIG. 3 is a side elevational view of the apparatus of FIG. 1.
Figure 4:
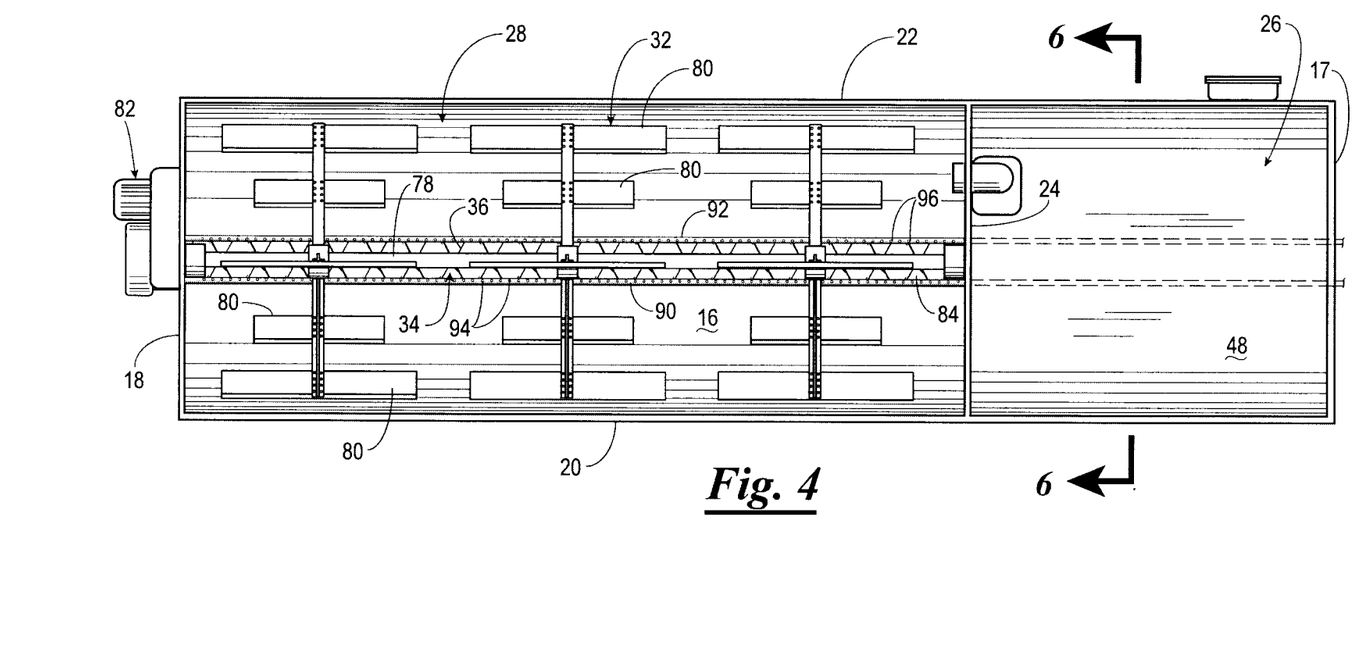
FIG. 4 is a top plan view of the apparatus of FIG. 1.

Referring now to the drawings, and more particularly to FIGS. 1, 3 and 4 shown therein is an apparatus 10 employed in the conversion of waste fluids into indigenous fertile top soil at the well site. The apparatus 10 includes a hopper 12 supported on a skid 14 for enhancing movement of the apparatus 10 to a desired location at the well site. While the apparatus 10 has been shown as having the skid 14 connected to a lower portion or bottom 16 of the hopper 12, any suitable structure can be employed in place of the skid 14, such as a plurality of axles and wheels, as long as the structure permits the apparatus 10, and thus the hopper 12, to be easily moved to the desired location at the well site.

The hopper 12 has a first end 17, a second end 18, a first side 20, a second side 22 and the bottom 16. A bulk head or partition 24 is secured in the hopper 12 so as to define a first compartment 26 and a second compartment 28. The first compartment 26, which is adapted to receive the waste fluid, is provided with a fluid transfer assembly 30; and the second compartment 28, which is designed to receive and treat the waste fluid, is provided with a mixing assembly 32 for mixing the waste fluid with additional components such as mature compost or humus material, organic fertilizer, indigenous soil from the well site, and effective amounts of other additives depending on evaluation of the waste fluid composition, during conversion of the mixture into indigenous fertile top soil.

Figure 5:
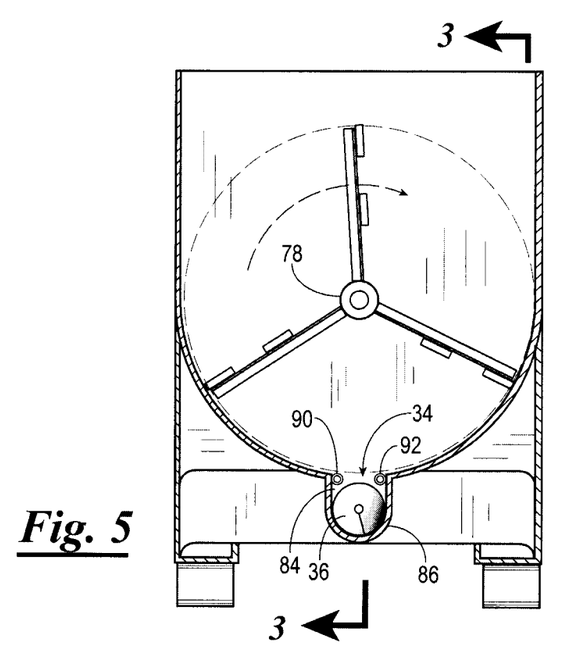
FIG. 5 is a cross sectional view of the apparatus of FIG. 3 taken along the line 5-5 thereof.

As shown in FIGS. 3-5, the apparatus 10 is further provided with a dispensing assembly 34 (FIGS. 3 and 4) which is in fluid communication with the second compartment 28 of the hopper 12. The dispensing assembly 34 includes an auger 36 and an exit opening 38 for discharging indigenous fertile top soil produced from waste fluid from the second compartment 28 of the hopper 12.

Figure 2:
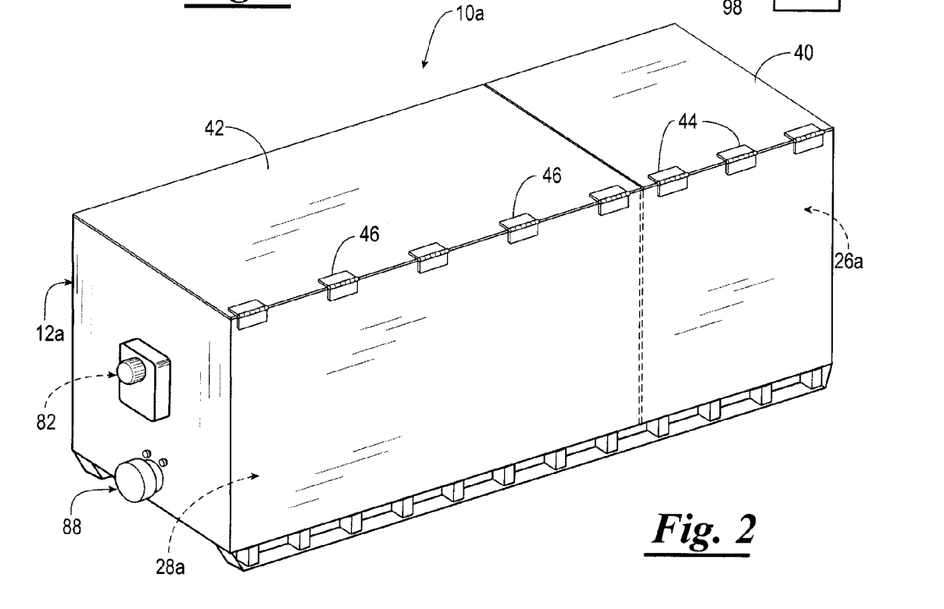
FIG. 2 is a pictorial representation of another embodiment of an apparatus for converting waste fluids into indigenous fertile top soil at the well site wherein the apparatus is provided with lids for closing off various compartments of the apparatus.

Shown in FIG. 2 is another embodiment of an apparatus 10a constructed in accordance with the present invention. The apparatus 10a is similar in construction to the apparatus 10 except that a first compartment 26a of the apparatus 10a is provided with a lid 40 and a second compartment 28a of the apparatus 10a is provided with a lid 42. It should be noted that the lids 40 and 42 of the apparatus 10a are connected to a hopper 12a of the apparatus 10a via a plurality of hinges 44 and 46, respectively, for permitting the lids 40 and 42 to be selectively moved between an open position and a closed position. That is, when the lid 40 is in an open position waste fluid can be introduced into the first compartment 26a of the apparatus 10a; and when the lid 42 of the apparatus 10a is in an open position solid and liquid ingredients can be incorporated into the second compartment 28a for mixing with the waste fluid disposed therein. While the lids 40 and 42 have been shown connected to the hopper 12a via the hinges 44 and 46, it should be understood that the lids 40 and 42 can be designed for slidable engagement with the hopper 12a or can merely be supported on the hopper 12a so as to selectively close off the first and second compartments 26a and 28a of the hopper 12a.

Since the apparatus 10 and 10a are similar in construction, except for the lids 40 and 42, and their connection to the hopper 12a via the hinges 44 and 46, only the apparatus 10 and the operation of the apparatus 10 will be described in detail hereinafter.

Referring more specifically to FIGS. 3 and 4, the first and second compartments 26 and 28 of the apparatus 10 will be described in more detail, as well as the fluid transfer assembly 30 for transferring the waste fluid from the first compartment 26 of the apparatus 10 to the second compartment 28 of the apparatus 10. It should be noted that while the first compartment 26 is shown as having a capacity less than about half of the capacity of the second compartment 28 of the apparatus 10, the size of the first compartment 26 relative to the second compartment 28 can be varied widely. However, when the size of the first compartment 26 relative to the second compartment 28 is increased in capacity, it may be desirable to incorporate a valve (not shown) into the fluid transfer assembly 30 so as to control the amount of waste fluid transferred from the first compartment 26 of the apparatus 10 to the second compartment 28 thereof because of the amount of solid and liquid ingredients mixed with the waste fluid in the second compartment 28 to produce indigenous fertile top soil from the waste fluid.

As previously stated, the apparatus 10 is provided with the bulk head or partition 24 for separating the first compartment 26 of the apparatus 10 from the second compartment 28 thereof. A floor 48 is provided in the first compartment 26 of the apparatus 10. The floor 48 is disposed a distance 50 from the bottom 16 of the hopper 12 and extends between the first and second sides 20 and 22 of the hopper 12, respectively, and the first end 17 of the hopper 12 and the bulk head or partition 24 so as to provide a chamber 52 below the floor 48 of the first compartment 26.

Figure 6:
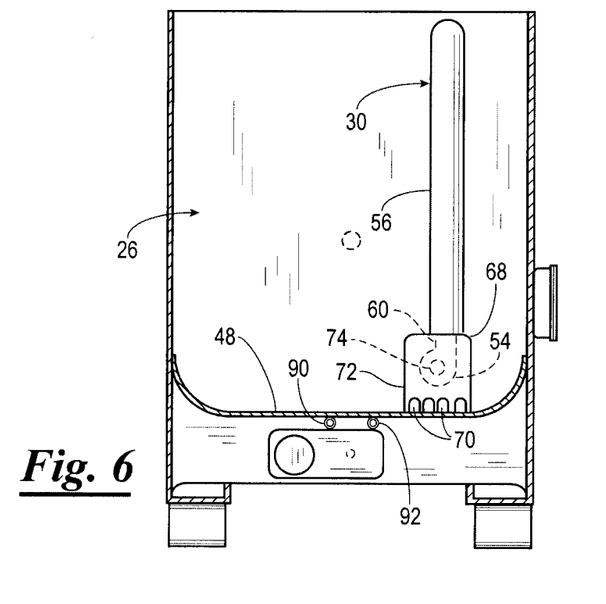
FIG. 6 is a cross sectional view of the apparatus of FIG. 4 taken along the line 6-6 thereof.

As more clearly shown in FIGS. 3 and 6, the fluid transfer assembly 30 includes a pump 54 supported on the floor 48 of the first compartment 26 and a transfer conduit 56. One end 58 of the transfer conduit 56 is connected to the pump 54 and in fluid communication with a discharge port 60 of the pump 54. An opposed second end 62 of the transfer conduit 56 is in fluid communication with the second compartment 28 of the hopper 12 via an opening 64 formed through the bulkhead or partition 24 so as to be disposed near an upper end 66 of the bulkhead or partition 24 substantially as shown. The pump 54 can be any conventional pump capable of pumping the waste fluid. Further, the pump 54 is connected to a power source in a conventional manner. Thus, no further details or description of the pump 54 and its connection to a power source are believed necessary to enable a person skilled in the art to understand and practice the present invention.

The waste fluid treated in the apparatus 10 will generally be filtered and/or screened prior to introduction into the first compartment 26 of the hopper 12 so as to remove any large particulate matter therefrom. However, in situations wherein the waste fluid is not filtered or screened, large particulate material may be present in the waste fluid disposed in the first compartment 26 of the hopper 12. Thus, the pump 54 may be provided with a cowling 68 having a plurality of openings 70 formed in a lower end 72 thereof which function as filters to prevent large particulate matter and other large objects present in the waste fluid from entering an inlet port 74 of the pump 54 and thereby clogging the pump 54.

Upon activation of the pump 54 spent water-based drilling fluid is transferred from the first compartment 26 of the hopper 12 into the second compartment 28 of the hopper 12 for admixture with compost or organic matter, manure, indigenous soil and when required, other additives to lower the sodium chloride content of the waste fluid or to add additional enzymes to enhance the breakdown of hydrocarbons which may be present in the waste fluid. Referring now to FIGS. 3-5, the mixing assembly 32, which is supported within the second compartment 28 of the hopper 12, includes a shaft 78 which is mounted longitudinally in the second compartment 28 of the hopper 12. The shaft 78 is mounted for rotation and is provided with a plurality of angularly disposed stirring elements or paddles 80 extending radially from the shaft 78 such that upon rotation of the shaft 78, the stirring elements or paddles 80 provide substantially uniform movement of the mixture formed of the waste fluid, mature compost, organic fertilizer, indigenous soil, and other additives as required, in the second compartment 28. The angular disposition of the stirring elements or paddles 80 will vary depending upon the overall configuration of the second compartment 28 of the hopper 12. Generally, the stirring elements or paddles 80 are configured and disposed along the shaft 78 in such a manner as to provide the required agitation of the mixture to provide a substantially homogenous mixture as a result of the substantially uniform movement of the mixture in the second compartment 28 of the hopper 12 during conversion of the waste fluid into fertile indigenous top soil.

The shaft 78 can be driven by a motor 82 or any other drive mechanism such as a chain drive system and the like. Further, the motor 82 and the pump 54 can be electrically activated in a conventional manner, or the motor 82 and the pump 54 can be operated via a diesel or gasoline engine. Thus, no further comments concerning the pump 54 or the motor 82 is believed necessary to anyone skilled in the art to understand and practice the present invention.

The dispersing assembly 34 of the apparatus 10 includes the auger 36 supported longitudinally in an air lock chamber 84 defined by a cylinder 86 (FIG. 5) which is supported below the second compartment 28 of the hopper 12. The auger 36 is rotatably mounted in the cylinder 86 so that upon conversion of the waste fluid into fertile indigenous top soil and activation of a motor 82 (FIG. 3), the auger 36 is rotated and fertile indigenous top soil is removed from the cylinder 86 via the exit opening 38. It should be noted that the exit opening 38 is provided with a cap 88 (FIGS. 2 and 3) which must be removed prior to discharging indigenous fertile top soil from the cylinder 80 and thus the air lock chamber 84 of the dispersing assembly 34.

Referring now to FIGS. 3, 5 and 6, the apparatus 10 further includes air supply conduits 90 and 92 for supplying compressed air, heated compressed air, and/or oxygen-enriched air, optionally at high volumes, into the second compartment 28 of the hopper 12 to substantially saturate the mixture with air and/or enhance enzyme activity on the hydrocarbon components present in the waste fluid during conversion of the waste fluid into the desired indigenous fertile top soil. Further, the introduction of air into the second compartment 28 of the hopper 12 can act to dry the indigenous fertile top soil product from the mixture. The air supply conduits 90 and 92 extend lengthwise through the hopper 12 such that a portion of each of the air supply conduits 90 and 92 extending through the chamber 52 in the first compartment 26 of the hopper 12 and a portion of the air supply conduits 90 and 92 containing apertures 94 and 96, respectively, are disposed adjacent an opening 92 of the cylinder 80 at a position so as to not interfere with the rotational movement of the auger 36 when the auger 36 is activated to dispense the indigenous fertile top soil produced in the second compartment 28 of the hopper 12 as hereinforth described. Thus, air supply conduits 90 and 92 are connected to an air supply source 98 (FIG. 1) such as a compressor, a tank, or the like so that compressed air can be injected into the second compartment 26 of the hopper 12 to enhance enzyme activity and thus conversion of the waste fluid into indigenous fertile top soil in accordance with the present invention. If required due to the ambient temperature at the well site, the compressed air can be heated to a temperature of least 60° F., and in one embodiment, from about 70° to 105° F.

Having described the apparatus 10 which is suitable for the conversion of waste fluid into indigenous fertile top soil, the method of converting such waste fluid into indigenous fertile top soil will now be described with reference to the drawings.

In one embodiment, the apparatus 10 is moved to the well site so that the waste fluid can be introduced into the first compartment 26 of the hopper 12. The apparatus 10 is provided with skids 14 so that the apparatus 10 can readily be moved to the well site by a vehicle. Once the apparatus 10 is in place, waste fluid is transferred from, for example, a mud pit or a containment vessel into the first compartment 26 of the hopper 12. The waste fluid can be passed through a filter and/or shaker (not shown) prior to introducing same into the first compartment 26 of the hopper 12 so as to remove any large particulate matter from the waste fluid.

In one embodiment, the waste fluid is analyzed, either before or after it has been transferred into the first compartment 26 of the hopper 12, to determine the amount and type of solids present in the waste fluid, as well as the pH of the waste fluid, the presence of heavy metals, soluble salts such as sodium chloride, and the total hydrocarbon or petroleum (tph) in the waste fluid. The analysis of the waste fluid is important because the amount of solids present in the waste fluid will determine the amount of the mature compost, organic fertilizer and indigenous top soil admixed with the waste fluid and/or the necessity to add additional fresh water. The soluble salt analysis will determine the need to treat for sodium. The pH of the waste fluid determines whether certain additional components are necessary. The hydrocarbon level and type will determine the need for additional hydrocarbon-digesting microbes and additional organic fertilizer for growth of the microbe inoculation. The amount of clay present will determine the need for clay treatment with gypsum. Additionally, if the pH of the waste fluid and/or the mixture resulting from mixing the waste fluid with compost, or organic matter, and/or organic manure (e. g., cow manure, chicken manure and hog manure), and indigenous soil in the second compartment 28 of the hopper 12 is less than 7, an effective amount of a natural material, such as lime (CaO), potassium hydroxide (KOH), and the like can be incorporated into either the waste fluid prior to transferring same into the second compartment 28, or into the mixture resulting by admixing the waste fluid with compost or organic matter, manure and indigenous soil. In one embodiment, the pH of the waste fluid is determined after the waste fluid has been transferred from the first compartment 26 of the hopper 12 to the second compartment 28 so that the pH of the mixture produced in the second compartment 28 of the hopper 12 has a pH of at least 7, or from about 7.5 to about 9.

It should be noted that by adjusting the pH to the desired range at least 7, any heavy metals present in the waste fluid and thus the mixture in the second compartment 28 of the hopper 12, bind to clay particles and insure that such heavy metals do not become water-soluble.

Methods of measuring and evaluating the solid content of the waste fluid and for determining the presence of heavy metals in the waste fluid, and/or the mixture of components including the waste fluid in the second compartment 28 of the hopper 12 are well known. Thus no further comments or discussion concerning the analysis of the waste fluid and/or the mixture in the second compartment 28 of the hopper 12 for presence of heavy metals is believed necessary to enable one skilled in the art to understand and practice the present invention.

The waste fluid in the mixture contained in the second compartment 28 of the hopper 12 can be analyzed for soluble salts such as sodium chloride via a comprehensive salt test. As will be described in more detail hereinafter, certain additives can be incorporated into the mixture contained within the second compartment 28 of the hopper 12 to, for example, balance the sodium content, reduce the hydrocarbon level, and to reduce adhesive characteristics of the clays present.

To convert the waste fluid into indigenous fertile top soil, effective amounts of mature compost, and organic matter (e.g. animal manure such as cow manure, pig manure, chicken manure, and the like), and indigenous soil are introduced into the second compartment 28 of the hopper 12. The amount of each component can vary. However, the mixture desirably contains an effective amount of waste fluid, from about 30 to 150 volume percent compost, from about 5 to about 20 volume percent dry organic manure and from about 5 to 20 volume percent indigenous soil, based on the total volume of the mixture. If heavy metals are present in the waste fluid it may be desirable to incorporate from about 5 to 15 volume percent of a material, such as gypsum, which is capable of reducing the adhesive characteristic of the clay particles and thereby insuring that the heavy metals remain bound to the clay and soil particles. When it is determined that the level of soluble salts in the waste fluid, and thus the mixture containing such waste fluid, is undesirable, the amount of such soluble salts can be reduced by incorporation of the aforementioned gypsum (calcium sulfate), or by incorporation of ion exchange compounds containing soil conditioners such as Nitracal-100™ and Nitracal-SC™ offered by SPL Control, L.L.C. of Elmore City, Okla.

In formulating the mixture, care should be exercised to ensure that the compost is mature compost to prevent an endothermic reaction which would heat the fertile indigenous top soil produced to a temperature beyond healthy temperature for plant growth and seed germination.

The addition of dry organic manure not only increases the presence of nitrogen in the fertile indigenous top solid produced in accordance with the present invention, but also introduces new microbes and enzymes into the resulting soil product. The incorporation of the indigenous top soil provides the soil produced from the waste fluid with the same microorganisms and enzymes as the soil surrounding the well site. The mature compost function as organic food for the microorganisms and the nitrogen from the dry organic manure speeds up the multiplication or growth of the microorganisms or microbes which are present in waste fluid. In the event the mixture becomes to viscose, fresh water may be added to the mixture to enhance mixing.

In most instances, the microorganisms and enzymes present in the indigenous top soil are sufficient to degrade or metabolize any hydrocarbon or petroleum products present in the waste fluid. However, if it is determined that additional enzymes should be added, various types of enzymes and/or micro-organisms capable of degrading the hydrocarbon and petroleum products which are well known in the art can be employed.

The mixture present in the second compartment 28 of the hopper 12 is thoroughly mixed via the stirring elements or paddles 80 so that substantially uniform movement of the mixture is provided throughout the second compartment 28 of the hopper 12 whereby a substantially homogenous mixture or slurry is formed. Thereafter, in order to further activate the enzymes, compressed air, or heated and compressed oxygen-enriched air, may be injected into the mixture via the apertures 94 and 96 of the air supply conduits 90 and 92, respectively. The air is desirably maintained at a temperature of at least 60° F., and preferably from about 70° F. to about 105° F. However, care should be exercised to ensure that the temperature of the air is not sufficient to heat the mixture contained in the second compartment 28 of the hopper 12 to temperature sufficient to kill or destroy any enzyme activity of the mixture.

Once it is determined that the waste fluid has been converted into indigenous fertile top soil, the air can be continued to be supplied into the second compartment 28 of the hopper 12 until the fertile indigenous top soil is in a semi-dried state. Thereafter, the flow of air is ceased, and the cap 88 is removed so that the exit opening 38 of the cylinder 86 is in an open condition. Thereafter, the auger 36 is activated and the semi-dried fertile indigenous top soil produced from the waste fluid is removed from the second compartment 28 of the hopper 12 for use in agricultural purposes at the location of the well. The fertile indigenous top soil so produced is then analyzed to determine the salt profile of such soil.

While much of the discussion has been directed to methods for decontamination of waste fluids at the well site, it is also possible to remediate oil spills and spills of waste fluids from oil and gas wells in a similar manner. Oil spills involve the release of liquid petroleum hydrocarbons due to accidental spills of crude oil from tankers, offshore platforms, drilling rigs and wells, as well as spills of refined petroleum products. Because most oils are less dense than water, the spilled oil floats on the water surface. The oil can penetrate the feathers of birds and the fur of animals, often causing them to die. Conventional methods to clean up such oil spills include addition of dispersants to the oily water, or addition of adsorbents often followed by burning. Bioremediation has also been tested. For example, a nutrient-rich emulsion can be added to the oil slick to create a bloom of indigenous, hydrocarbon-digesting bacteria which will break down the hydrocarbons into water and carbon dioxide.

It has been found that mixing an organic fertilizer with saw dust or wood shavings can produce a floatable bacterial nutrient. Application of such a floatable bacterial nutrient onto an oil-impacted water surface can rapidly remediate the oil spill. Any bacterial nutrient can be used. One source of nutrients particularly useful for culturing hydrocarbon-digesting bacteria is poultry waste. If the rate of remediation must be faster than achievable with indigenous bacteria, additional hydrogen-digesting bacteria are added to the floatable bacterial nutrient mixture.

In order to further explain the present inventive concepts, the following example is set forth. However, it is to be understood that the example is for illustrative purposes and are not intended to limit the scope of the present invention.

EXAMPLE

Waste fluid was collected from three different well locations in the Anadarko basin. These wells represent the true character of the contaminate profile of water-based drilling mud used at those three specific well locations. The waste drilling mud from each location was mixed to form a fertile indigenous top soil containing 70 volume percent commercial compost, 20 volume percent cow manure, 5 volume percent sand, 10 volume percent gypsum, and 20 volume percent indigenous top soil to form a substantially uniform mixture. The soil was then taken to Oklahoma State University at Oklahoma City, Okla. Seeds of native grasses and small plants were germinated and grown in the samples of the indigenous top soil produced from the water-based drilling mud. The seeds of the native grasses and small plants were planted in the indigenous top soil produced using the waste fluids are growing and the tomato plants are producing beautiful and delicious tomatoes. It should be noted that there wasn't anything that was taken out of the drilling mud waste to make the fertile indigenous top soil, it was added. This example clearly shows that the liquid and solid waste from drilling oil and gas wells does not have to leave the location but can be turned into fertile indigenous top soil within a few hours and used to grow any native commercial crop or vegetation. The top soil is complete in and of itself; not just a soil additive or conditioner. Thus, the soil can start, sustain and bear beautiful edible fruit. Environmental perfection. The top soil made at the drilling well sites. Each well sites top soil has the exact same microorganisms and enzymes as in the surrounding soil where the well was drilled. Further, this top soil made from the waste fluids will have both mineral and organic fertility, greater enzyme activity surrounded by organic food and genetically the same microorganisms and enzymes as the surrounding soil at each well site, thereby resulting in more fertile indigenous top soil, capable of growing a better grade of vegetation then around the well site.

From the above description, it is clear that the inventive concepts disclosed herein are well adapted to carry out the objects and to attain the advantages mentioned herein as well as those inherent in the inventive concepts disclosed herein. While exemplary embodiments of the inventive concepts disclosed herein have been described for purposes of this disclosure, it will be understood that numerous changes may be made which will readily suggest themselves to those skilled in the art and which are accomplished without departing from the scope of the inventive concepts disclosed herein and defined by the appended claims.

What is claimed is:

1. A well site waste fluid decontamination process comprising the steps of:

evaluating a waste fluid to determine if the waste fluid comprises fracturing fluid requiring treatment for sodium;

evaluating the waste fluid to determine if the waste fluid comprises a hydrocarbon level requiring hydrocarbon treatment;

evaluating the waste fluid to determine if the waste fluid comprises drilling fluid requiring clay treatment;

mixing mature compost, organic fertilizer, and top soil with the waste fluid to form a mixture containing waste fluid, from about 30 to 150 volume percent mature compost, from about 5 to 20 volume percent organic fertilizer, and from about 5 to 20 volume percent top soil from the well site wherein each volume percent is based on the volume of the waste fluid present in the mixture;

if the waste fluid comprises fracturing fluid requiring treatment for sodium, mixing calcium nitrate with the waste fluid in an amount sufficient to balance the sodium content thereof;

if the waste fluid comprises a hydrocarbon level requiring hydrocarbon treatment, mixing an additional 5 to 100 volume percent organic fertilizer with the waste fluid, the volume percent based on the volume of waste fluid, and mixing hydrocarbon-digesting microbes with the waste fluid in an amount sufficient to inoculate the waste fluid;

if the waste fluid comprises drilling fluid requiring clay treatment, mixing with the waste fluid with 5 to 15 volume percent gypsum, based on the volume of waste fluid, to break up and reduce adhesive characteristics of clay particles present in the waste fluid;

stirring the mixture for a period of time effective to form a substantially homogenous mixture; and drying the substantially homogenous mixture so as to produce fertile top soil.

2. The process of claim 1 wherein the mixture is maintained at a pH in a range of from about 7 to about 9.5.

3. The process of claim 1, further comprising injecting an effective amount of air into the substantially homogenous mixture to enhance enzyme and microbial activity on hydrocarbons components present in the waste fluid during conversion of the waste fluid into fertile top soil.

4. The process of claim 3 wherein the air is injected into the mixture in an amount and at a velocity sufficient to dry the mixture and thereby produce the fertile top soil.

5. The process of claim 3 wherein the temperature of the air is at least 60° F.

6. The process of claim 3 wherein the temperature of the air is from about 70° F. to about 105° F.

7. The process of claim 1, further comprising introducing an effective amount of water into the mixture to enhance formation of the substantially homogenous mixture and to enhance stirring of the mixture to form the substantially homogenous mixture.

8. A well site waste fluid decontamination process comprising the steps of:

positioning near a well site, an apparatus including a hopper, the hopper having at least one compartment with a mixing assembly, and at least one air supply conduit for supplying air into the at least one compartment;

evaluating a waste fluid to determine if the waste fluid comprises fracturing fluid requiring treatment for sodium;

evaluating the waste fluid to determine if the waste fluid comprises a hydrocarbon level requiring hydrocarbon treatment;

evaluating the waste fluid to determine if the waste fluid comprises drilling fluid requiring clay treatment;

mixing the waste fluid with mature compost, organic fertilizer, and top soil in the at least one compartment of the hopper to form a mixture having a pH in the range of from about 7 to 9.5, from about 30 to 150 volume percent mature compost, from about 5 to 20 volume percent organic fertilizer, and from about 5 to 20 volume percent top soil, wherein each volume percent is based on the volume of the waste fluid present in the mixture;

if the waste fluid comprises fracturing fluid requiring treatment for sodium, mixing calcium nitrate with the waste fluid in an amount sufficient to balance the sodium content thereof;

if the waste fluid comprises a hydrocarbon level requiring hydrocarbon treatment, mixing an additional 5 to 100 volume percent organic fertilizer with the waste fluid, the volume percent based on the volume of waste fluid, and mixing hydrocarbon-digesting microbes with the waste fluid in an amount sufficient to inoculate the waste fluid;

if the waste fluid comprises drilling fluid requiring clay treatment, mixing 5 to 15 volume percent gypsum with the waste fluid, the volume percent based on the volume of waste fluid, to break up and reduce adhesive characteristics of clay particles present in the waste fluid;

activating the mixing assembly so as to stir the mixture for a period of time effective to form a substantially homogenous mixture;

drying the substantially homogenous mixture so as to produce fertile top soil; and removing the fertile top soil from the at least one compartment of the hopper.

9. A well site waste fluid decontamination process comprising the steps of:

positioning near a well site, an apparatus including a hopper, the hopper having at least one compartment with a mixing assembly, and at least one air supply conduit for supplying air into the at least one compartment;

evaluating a waste fluid to determine if the waste fluid comprises fracturing fluid requiring treatment for sodium;

evaluating the waste fluid to determine if the waste fluid comprises a hydrocarbon level requiring hydrocarbon treatment;

evaluating the waste fluid to determine if the waste fluid comprises drilling fluid requiring clay treatment;

mixing the waste fluid with mature compost, organic fertilizer, and top soil in the at least one compartment of the hopper to form a mixture having a pH in the range of from about 7 to 9.5, from about 30 to 150 volume percent mature compost, from about 5 to 20 volume percent organic fertilizer, and from about 5 to 20 volume percent top soil, wherein each volume percent is based on the volume of the waste fluid present in the mixture;

if the waste fluid comprises fracturing fluid requiring treatment for sodium, mixing calcium nitrate with the waste fluid in an amount sufficient to balance the sodium content thereof;

if the waste fluid comprises a hydrocarbon level requiring hydrocarbon treatment, mixing an additional 5 to 100 volume percent organic fertilizer with the waste fluid, the volume percent based on the volume of waste fluid, and mixing hydrocarbon-digesting microbes with the waste fluid in an amount sufficient to inoculate the waste fluid;

if the waste fluid comprises drilling fluid requiring clay treatment, mixing 5 to 15 volume percent gypsum with the waste fluid, the volume percent based on the volume of waste fluid, to break up and reduce adhesive characteristics of clay particles present in the waste fluid;

activating the mixing assembly so as to stir the mixture for a period of time effective to form a substantially homogenous mixture;

injecting an amount of air into the mixture to enhance enzyme and microbial activity on hydrocarbon components present in the waste fluid, the air injected at a temperature of from 70° to 105° F. and in an amount and at a velocity sufficient to dry the mixture so as to produce fertile top soil; and removing the fertile top soil from the at least one compartment of the hopper.

* * * * *